(12) United States Patent
Suzuki (10) Patent No.: US 11,325,403 B2
(45) Date of Patent: May 10, 2022

(54) PRINTING APPARATUS

(71) Applicant: CANON KABUSHIKI KAISHA, Tokyo (JP)

(72) Inventor: Masaki Suzuki, Hokkaido (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/161,177

(22) Filed: Jan. 28, 2021

(65) Prior Publication Data

US 2021/0237490 A1    Aug. 5, 2021

(30) Foreign Application Priority Data

Jan. 31, 2020 (JP) .............................. JP2020-015606

(51) Int. Cl.
| | |
|---|---|
| *B41J 13/00* | (2006.01) |
| *B41J 11/00* | (2006.01) |
| *G06F 3/12* | (2006.01) |
| *B41J 2/325* | (2006.01) |
| *B41J 29/393* | (2006.01) |

(52) U.S. Cl.
CPC ....... *B41J 13/0045* (2013.01); *B41J 11/0045* (2013.01); *B41J 11/0095* (2013.01); *G06F 3/121* (2013.01); *B41J 2/325* (2013.01); *B41J 29/393* (2013.01)

(58) Field of Classification Search
CPC ............... B41J 13/0045; B41J 11/0045; B41J 11/0095; B41J 2/325; B41J 29/393; G06F 3/121

See application file for complete search history.

(56) References Cited

U.S. PATENT DOCUMENTS

| | | | | |
|---|---|---|---|---|
| 8,432,420 B2* | 4/2013 | Kakuta | .................... | B41J 17/28 |
| | | | | 347/171 |
| 8,770,870 B2* | 7/2014 | Otoshi | .................... | B41J 17/12 |
| | | | | 400/76 |

FOREIGN PATENT DOCUMENTS

| | | |
|---|---|---|
| JP | 2008-080647 A | 4/2008 |
| JP | 2017094642 A | 6/2017 |
| JP | 2018075743 A | 5/2018 |

* cited by examiner

*Primary Examiner* — Henok D Legesse
(74) *Attorney, Agent, or Firm* — Canon U.S.A., Inc. I.P. Division

(57) ABSTRACT

A printing apparatus includes a thermal head, a paper feed unit, a paper detection unit, an ink ribbon take-up unit, an detection unit, and a control unit. The thermal head transfers ink applied to an ink ribbon onto paper. The paper feed unit feeds paper stacked on a paper stacking unit and conveys the paper. The paper detection unit detects the fed paper. The ink ribbon takes-up unit take up the ink ribbon. The detection unit detects a printing start position of the ink ribbon. The control unit controls feeding of the stacked paper from the paper stacking unit, suspend the conveyance of the paper upon detection of the fed paper, take up the ink ribbon with the ink ribbon take-up unit, stop the ink ribbon take-up upon detection of the printing start position of the ink ribbon, and restart the conveyance of the paper with the paper feed unit.

14 Claims, 9 Drawing Sheets

PRINTING APPARATUS

BACKGROUND

Field

The present disclosure relates to a printing apparatus that transfers an ink of an ink ribbon onto paper by using a thermal head.

Description of the Related Art

In recent years, there have been many printing apparatuses that easily obtain a print product based on image data obtained with digital cameras or smart phones.

The thermal transfer recording method using a thermal head is one of recording methods that have conventionally been used by such printing apparatuses. The thermal transfer recording method is a method for obtaining a high-quality image printing based on a simple structure. The thermal transfer recording method brings a recording medium, such as paper, and an ink ribbon into pressure contact with each other by using a thermal head and a platen roller, supplies an electric current to the thermal head to heat a heating device on the thermal head to sublimate a dye ink applied to the ink ribbon, and transfers the dye ink onto the paper, thus performing printing. A printing apparatus with the thermal transfer recording method for performing full color printing is configured to make a full color printed material by sequentially transferring dye inks of three different colors (yellow (Y), magenta (M), and cyan (C) dye inks applied to the ink ribbon in this order) in an overlapped way.

To allow the ink ribbon to be easily attached to and detached from the printing apparatus, an ink ribbon cassette stores a cylindrical supply bobbin and a take-up bobbin. The ink ribbon is wound up around the supply bobbin. The supply bobbin and the take-up bobbin are rotatably supported in the ink ribbon cassette.

When the ink ribbon cassette is attached to the printing apparatus, the thermal head is positioned between the supply bobbin and the take-up bobbin. In a state where the ink ribbon overlays the paper, the printing apparatus drives the thermal head while the thermal head is being brought into pressure contact with the platen roller, thus performing printing.

It is common that paper is supplied in a package bag, stored in a stacked way in a paper tray provided in the printing apparatus, and fed into the printing apparatus upon reception of a print instruction.

Japanese Patent Application Laid-Open No. 2008-80647 discusses a printing apparatus having a paper tray in the front portion of the printing apparatus. Paper can be stored in the paper tray, and an ink ribbon cassette can be attached from a side surface of the printing apparatus. The printing apparatus discussed in Japanese Patent Application Laid-Open No. 2008-80647 winds the ink ribbon stored in the ink ribbon cassette to the printing start position (initial setting of the yellow ink ribbon), feeds paper from the paper tray, adjusts the printing start position of the paper, and performs printing.

In the technique disclosed in Japanese Patent Application Laid-Open No. 2008-80647, however, when printing is started in a state where no paper is stored in the paper tray, the printing apparatus firstly winds the ink ribbon to complete the initial setting of the yellow ink ribbon. Since no paper is stored in the paper tray, the printing apparatus cannot feed paper from the print tray and thus suspends printing. If paper is set in the paper tray in this state and then printing is restarted, the printing apparatus performs printing as usual. However, in a case where there is no paper to be stored in stock nearby, printing needs to be completely terminated. The printing apparatus then returns to the initial state, and thereby the ink ribbon cassette can be detached from the printing apparatus. If the ink ribbon cassette is once detached and then the same ink ribbon cassette is attached again, the printing apparatus cannot determine whether the reattached ink ribbon cassette has been completed of the initial setting of the yellow ink ribbon. When the next reception of the following print instruction occurs, the printing apparatus takes up the ink ribbon again to complete the initial setting of the yellow ink ribbon, accordingly. Multiple take ups of an ink ribbon wastes an amount of the ink ribbon for one image.

As a possible method for preventing the ink ribbon from being wasted, the printing apparatus may detect with a sensor whether paper is stored in the paper tray. If no paper is stored in the paper tray, the printing apparatus may suspend the start of the initial setting operation for the yellow ink ribbon. However, a sensor needs to be newly added in the paper tray, possibly resulting in an increase in cost of the printing apparatus.

SUMMARY

The present disclosure is directed to offering a printing apparatus capable of performing print processing without wasting an ink ribbon or paper even if print processing is started in a state where no paper is stored in a paper stacking unit or in a state where no ink ribbon is left.

According to an aspect of the present disclosure, a printing apparatus includes a thermal head configured to transfer ink applied to an ink ribbon onto paper, a paper feed unit configured to feed paper stacked on a paper stacking unit and convey the paper, a paper detection unit configured to detect the paper fed by the paper feed unit, an ink ribbon take-up unit configured to take up the ink ribbon, an ink ribbon detection unit configured to detect a printing start position of the ink ribbon, and a control unit configured to control the paper feed unit to feed the stacked paper from the paper stacking unit, suspend the conveyance of the paper by the paper feed unit upon detection of the fed paper with the paper detection unit, take up the ink ribbon with the ink ribbon take-up unit, stop the ink ribbon take-up with the ink ribbon take-up unit upon detection of the printing start position of the ink ribbon by the ink ribbon detection unit, and restart the conveyance of the paper with the paper feed unit.

Further features of the present disclosure will become apparent from the following description of exemplary embodiments with reference to the attached drawings.

DESCRIPTION OF THE EMBODIMENTS

An exemplary embodiment of the present disclosure will be described below with reference to FIGS. 1A to 7.

Figure 1A:
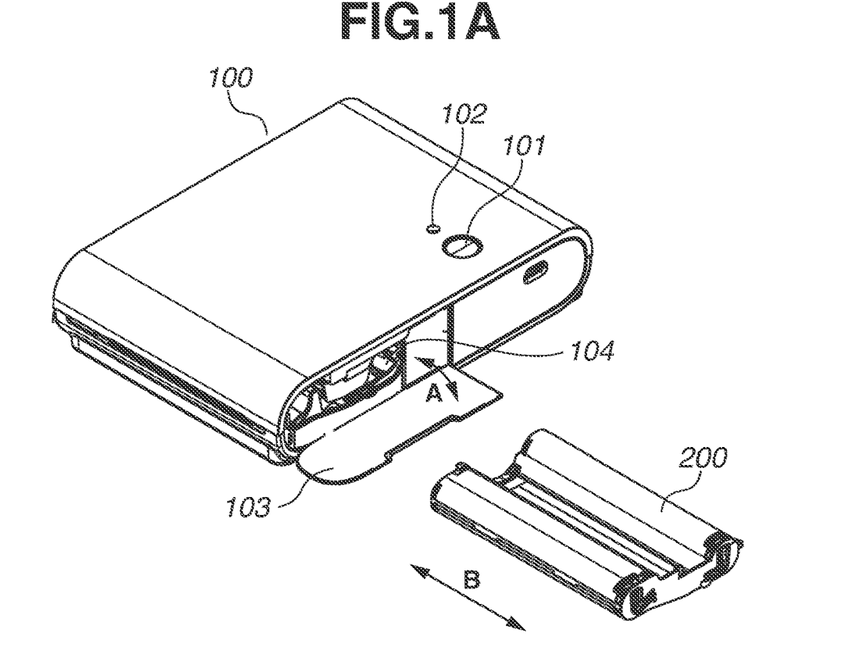
FIGS. 1A and 1B are perspective views of the entire configuration of a printer.
Figure 1B:
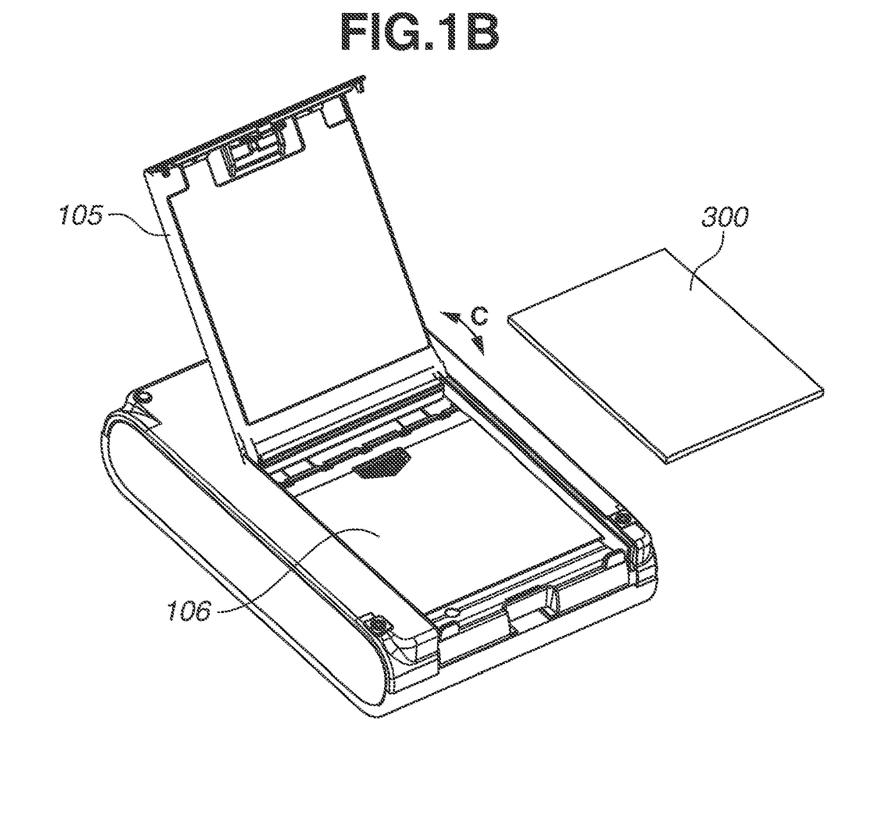

FIGS. 1A and 1B are perspective views of the entire configuration of a printer according to the exemplary embodiment of the present disclosure. FIG. 1A is a perspective view of the printer viewed from the top surface. FIG. 1B is a perspective view of the printer viewed from the bottom surface. As illustrated in FIG. 1A, a power button 101 and a display unit 102 are disposed on the top surface of a printer 100. Power of the printer 100 can be turned on by operating the power button 101. The display unit 102 blinks or lights up. When power of the printer 100 is turned on, the display unit 102 lights up. The display unit 102 can light up in two colors (yellow and red). The display unit 102 lights up in yellow in a normal state and lights up in red when an error occurs. A cover 103 provided on the side surface of the printer 100 is configured to be opened and closed in the direction of the arrow A. When the cover 103 is opened, an ink ribbon cassette 200 can be attached to and detached from an ink ribbon cassette insertion port 104 in the direction of the arrow B. As illustrated in FIG. 1B, the bottom surface of the printer 100 is provided with a paper cover 105 pivotally supported so that the paper cover 105 can be opened and closed in the direction of the arrow C. A paper stacking unit 106 is provided inside the opened paper cover 105. In a state where the paper cover 105 is opened, the user can load the paper stacking unit 106 with paper 300 cut in a predetermined length. The paper 300 stacked on the paper stacking unit 106 is drawn toward the inside of the printer 100 one by one by a paper feed mechanism (described below) provided in the printer 100.

Figure 2A:
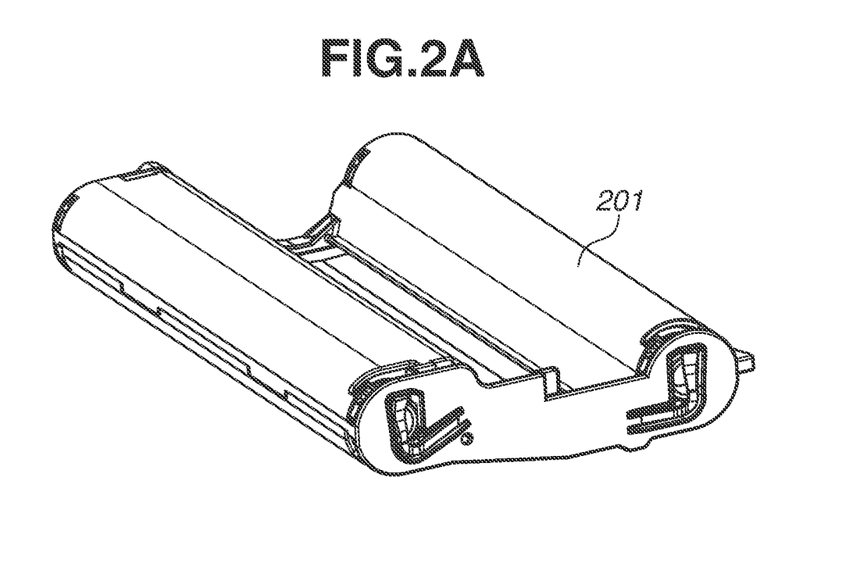
FIGS. 2A and 2B are perspective views of an ink ribbon cassette.
Figure 2B:
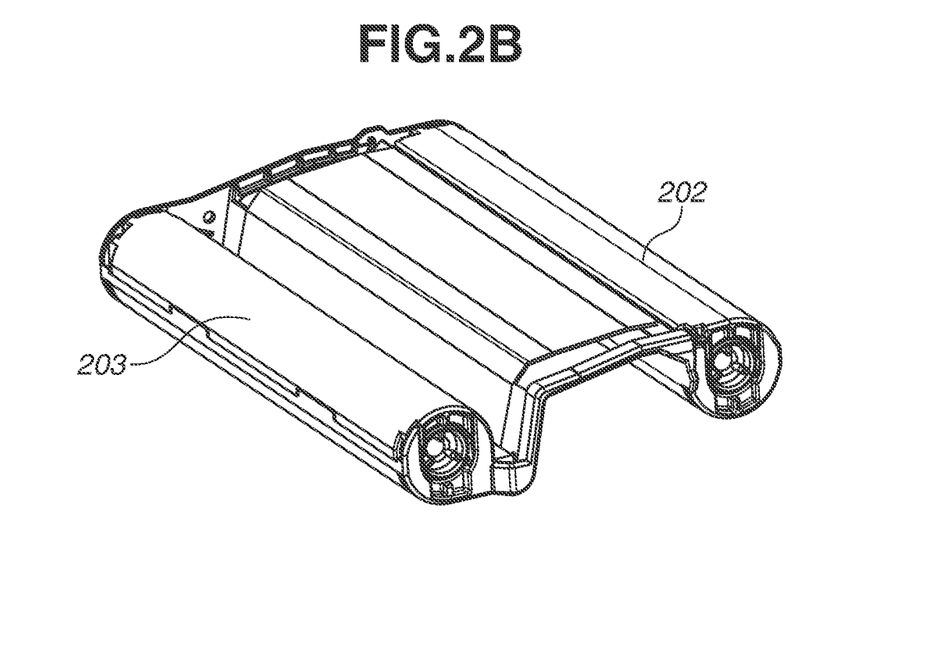
Figure 3:
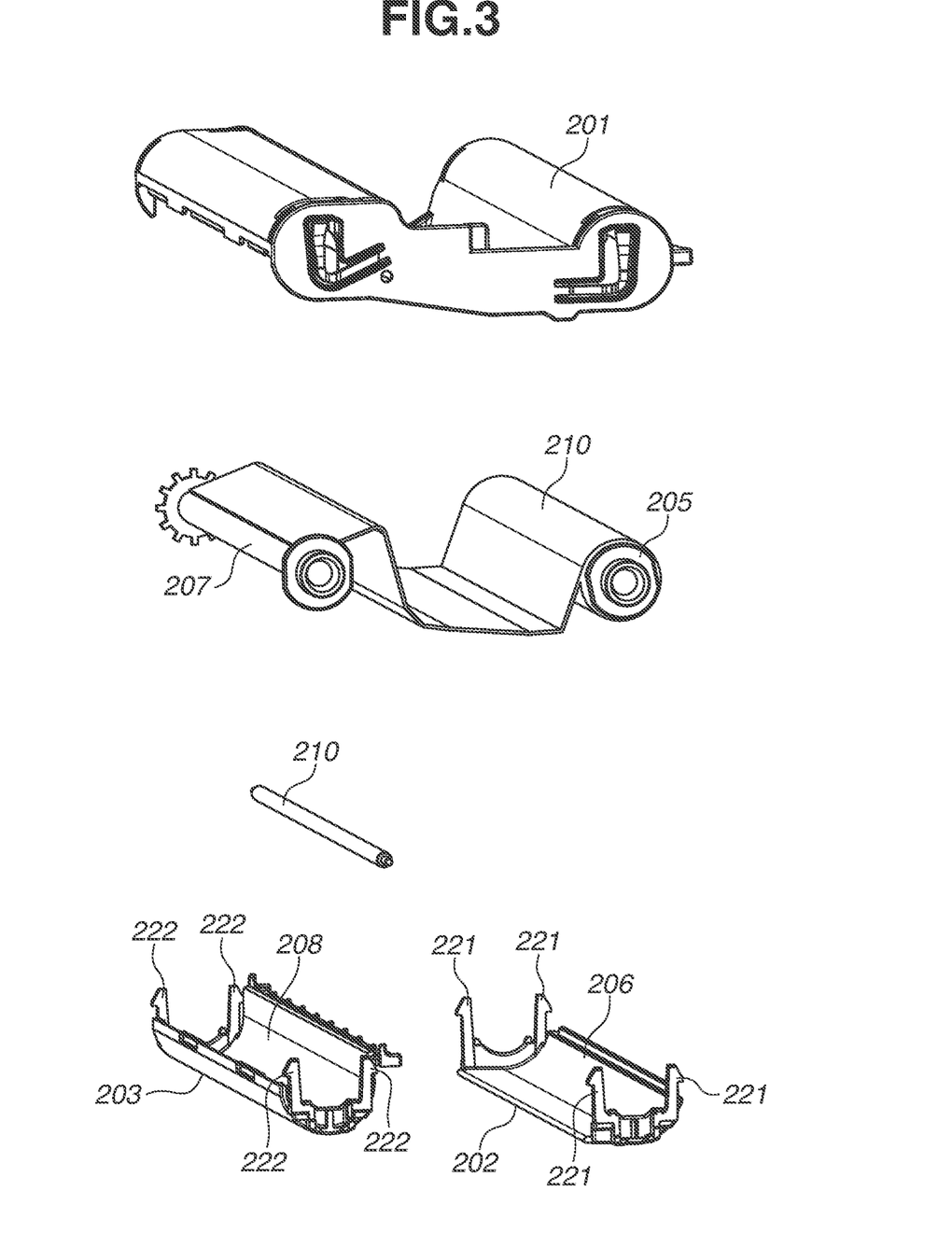
FIG. 3 is an exploded perspective view of the ink ribbon cassette.

FIGS. 2A and 2B are perspective views of the ink ribbon cassette 200 according to the exemplary embodiment of the present disclosure. FIG. 2A is a perspective view of the ink ribbon cassette 200 viewed from the top surface. FIG. 2B is a perspective view of the ink ribbon cassette 200 viewed from the bottom surface. FIG. 3 is an exploded perspective view of the ink ribbon cassette 200 according to the exemplary embodiment of the present disclosure.

The housing of the ink ribbon cassette 200 includes an upper case 201, a first lower case 202, and a second lower case 203 as illustrated in FIGS. 2A, 2B, and 3. The upper case 201, the first lower case 202, and the second lower case 203 are made of resin.

A supply bobbin 205 and a take-up bobbin 207 have the same shape and are made of resin. An ink ribbon 210 is wound around the supply bobbin 205. As illustrated in FIG. 3, the first lower case 202 is provided with a supply bobbin storage 206 for storing the supply bobbin 205. The first lower case 202 is provided with a pair of engagement claws 221 at each of both ends of the first lower case 202 for engaging with the upper case 201. The second lower case 203 is provided with a take-up bobbin storage 208 for storing the take-up bobbin 207. The second lower case 203 is provided with a pair of engagement claws 222, at each of both ends of the second lower case 203 for engaging with the upper case 201.

The supply bobbin 205 is rotatably supported by the upper case 201 and the first lower case 202. The take-up bobbin 207 is rotatably supported by the upper case 201 and the second lower case 203. When the take-up bobbin 207 is rotatably driven, the ink ribbon 210 wound around the supply bobbin 205 can be taken up by the take-up bobbin 207.

Figure 4:
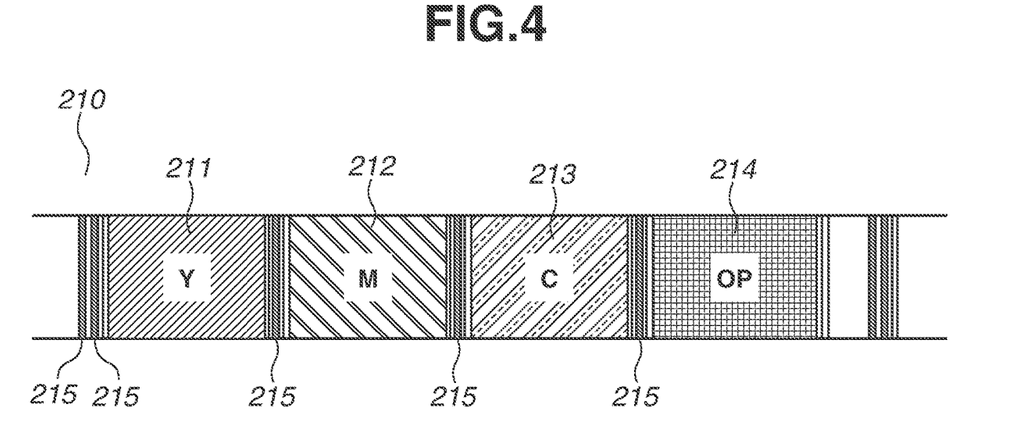
FIG. 4 is a development view of an ink ribbon.

FIG. 4 is a development view of the ink ribbon 210 according to the exemplary embodiment of the present disclosure. As illustrated in FIG. 4, the ink ribbon 210 is applied with a yellow dye 211, a magenta dye 212, a cyan dye 213, and an overcoat layer 214 in this order. A band-like marker 215 is applied at a start position of each surface of the ink ribbons. The marker 215 is a black colored line. An ink ribbon sensor (described below) can detect that radiation light is blocked by the marker 215. At the leading portion of the yellow dye 211, two markers 215 are applied. These markers are different from the leading portions of other colors to which one marker 215 is applied. By identifying the difference, the ink ribbon sensor can recognize the start position of the yellow dye 211.

Figure 5A:
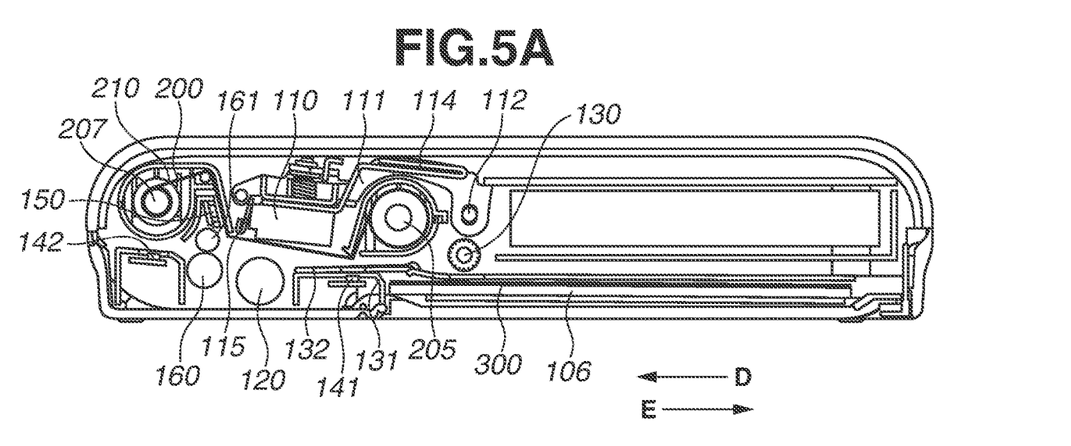
FIGS. 5A to 5G are cross-sectional views illustrating the printer in printing operation.
Figure 5B:
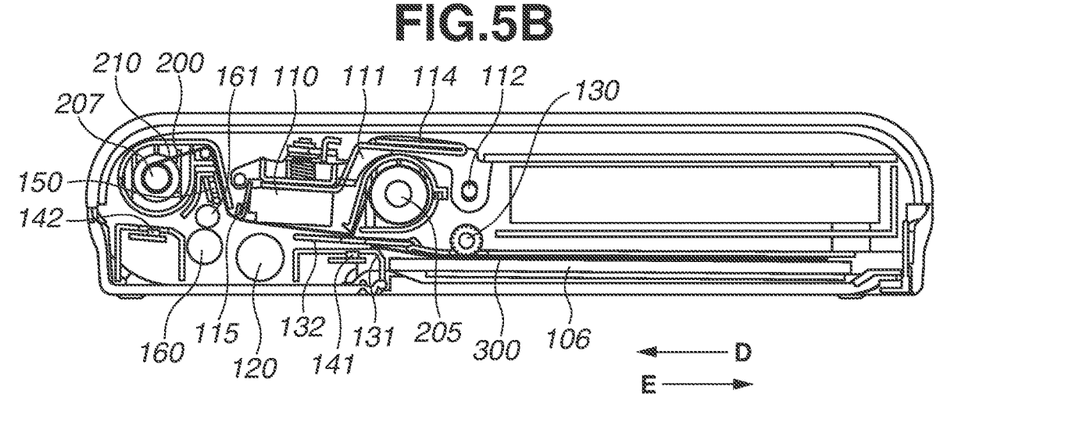
Figure 5C:
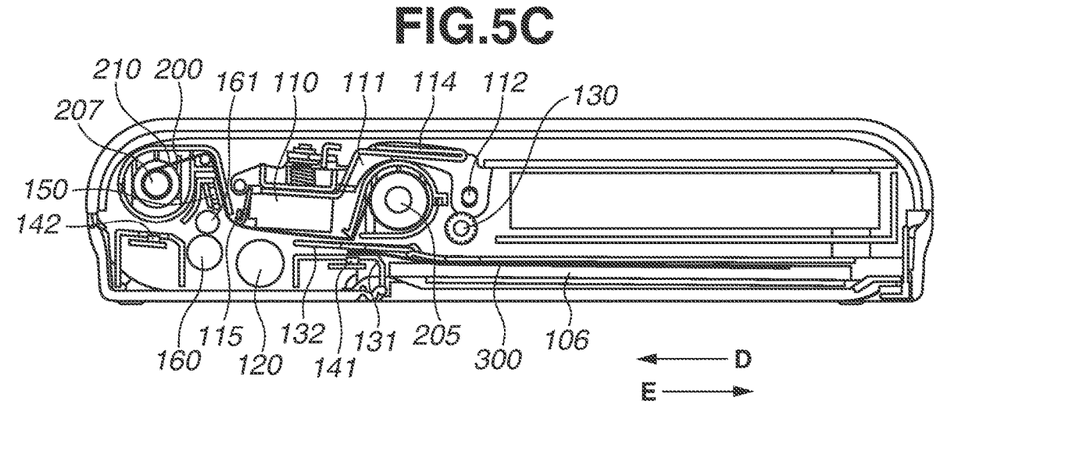
Figure 5D:
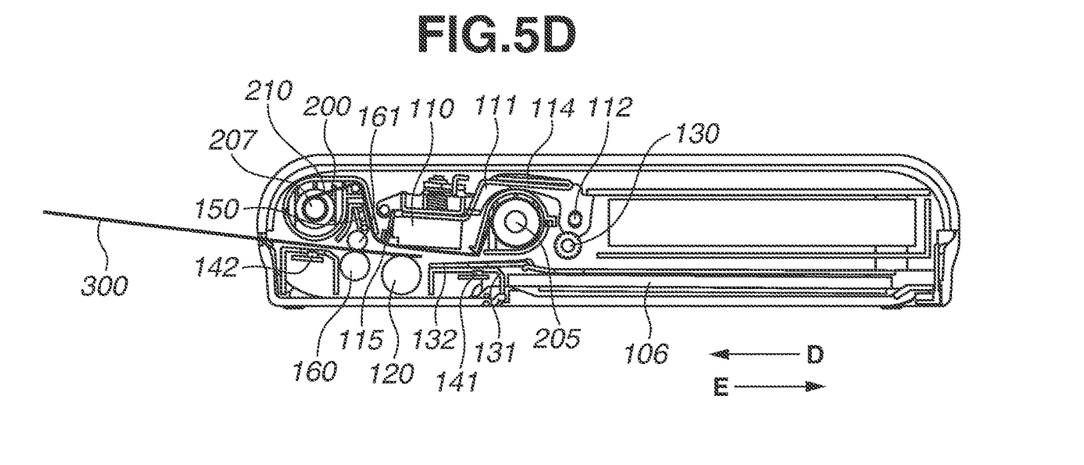
Figure 5E:
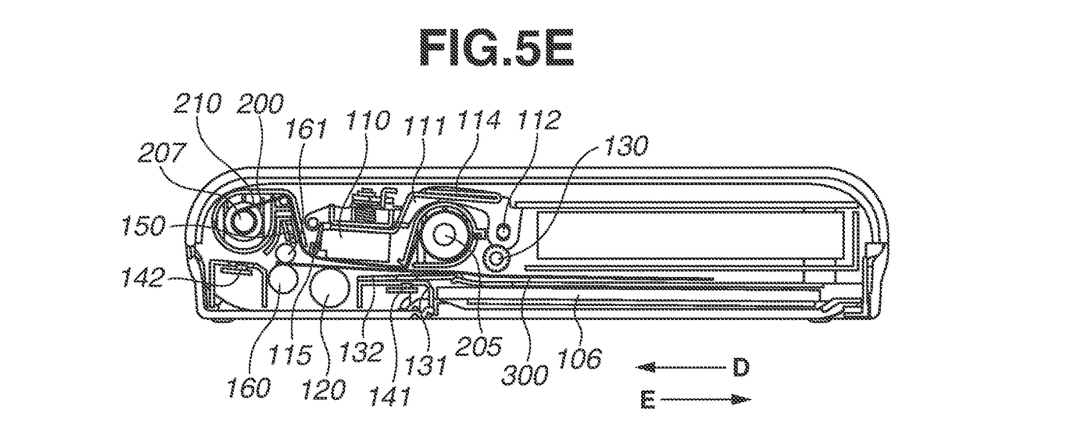
Figure 5F:
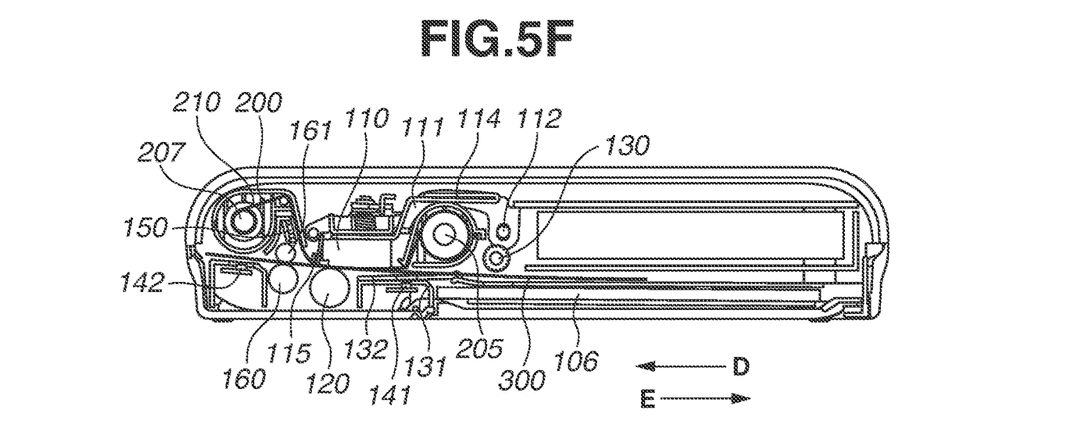
Figure 5G:
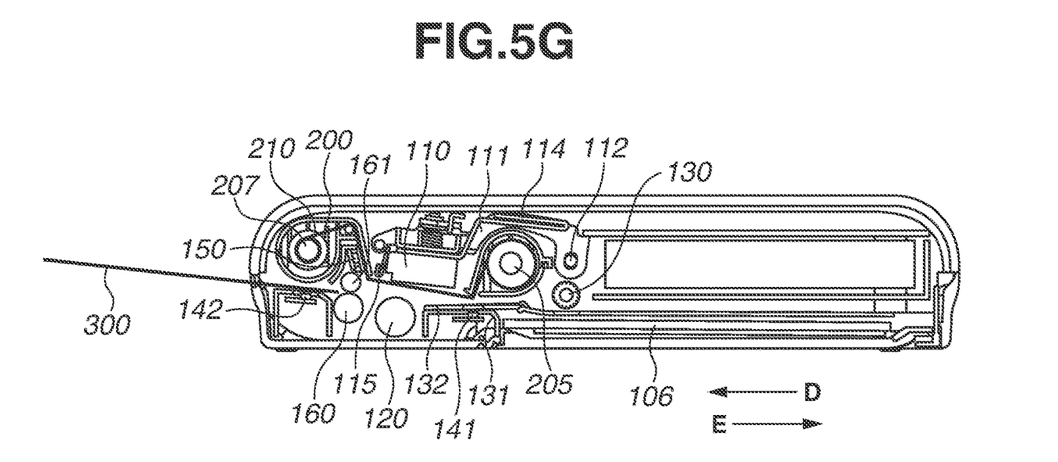

FIGS. 5A to 5G are cross-sectional views illustrating printing operation of the printer 100 according to the exemplary embodiment of the present disclosure. FIG. 5A is a cross-sectional view of the printer 100 in a stand-by state. FIG. 5B is a cross-sectional view of the printer 100 in paper feed operation. FIG. 5C is a cross-sectional view of the printer 100 in initial setting operation for the ink ribbon 210. FIG. 5D is a cross-sectional view of the printer 100 in a state after restarting paper feed. FIG. 5E is a cross-sectional view of the printer 100 in a state where printing is started. FIG. 5F is a cross-sectional view of the printer 100 in a state during printing. FIG. 5G is a cross-sectional view of the printer 100 in a state after discharging the paper 300.

As illustrated in FIG. 5A, a head arm 111 is supported rotatably around a head supporting axis 112. A thermal head 110 is supported by the head arm 111. The thermal head 110 is rotatable from the stand-by position illustrated in FIG. 5A to the print position illustrated in FIG. 5F. The thermal head 110 can generate a pressure contact force between the thermal head 110 and a platen roller 120.

As illustrated in FIG. 5A, the thermal head 110 in a stand-by state is urged in the clockwise direction around the head supporting axis 112 by a head urging spring (not illustrated). The thermal head 110 is regulated at a stand-by position where the distance from the platen roller 120 is maximized to avoid the interference during inserting or removing of the ink ribbon cassette 200.

The heat radiation plate 114 is attached to the thermal head 110 and is configured to transfer the heat generated in the thermal head 110 to the heat radiation plate 114. The platen roller 120 is rotatably disposed in the printer 100 and is configured to rotate according to the conveyance of the paper 300. A separation plate 115 is attached to the thermal head 110 and is configured to change the orientation of the ink ribbon 210 by about 90 degrees to separate the ink ribbon 210 from the paper 300.

A feed roller 130 is driven to rotate by a paper feed drive motor (not illustrated). The feed roller 130 is movable between a withdrawal position and a paper feed position. The withdrawal position is a position where the feed roller 130 is separated from the paper 300 stacked on the paper stacking unit 106 as illustrated in FIG. 5A. The paper feed position is a position where the feed roller 130 comes in contact with the paper 300 stacked on the paper stacking unit 106 as illustrated in FIG. 5B.

When the paper 300 is fed, a paper guide 132 is raised by the paper 300. The paper guide 132 is supported rotatably from the position illustrated in FIG. 5A to the position illustrated in FIG. 5B. A paper guide 132 is constantly urged in the downward direction (toward the separation plate 131) and is positioned in contact with the separation plate 131 illustrated in FIG. 5A.

A paper feed port sensor 141 and a paper discharge port sensor 142 are paper detection sensors that detect radiation light reflected by the back surface of the paper 300 to allow detecting the presence of the paper 300. The paper feed port sensor 141 and the paper discharge port sensor 142 are disposed in the paper conveyance path. The paper feed port sensor 141 is disposed between the paper stacking unit 106 and the thermal head 110. More specifically, the paper feed port sensor 141 is disposed on the downstream side of the paper stacking unit 106 in the direction of the arrow D, which is the paper feed direction and the paper conveyance direction during printing, and on the upstream side of the printing position (image printing position) of the thermal head 110. The paper discharge port sensor 142 is disposed on the downstream side of the thermal head 110 in the direction of the arrow D, and is disposed between the thermal head 110 and a conveyance roller 160, and the paper discharge port.

The ink ribbon sensor 150 is configured to detect the ink ribbon 210 and to detect radiation light reflected by the wall surface of the ink ribbon cassette 200. When the radiation light is blocked by the markers 215, the positions of the markers 215 can be detected.

A conveyance roller 160 is driven to rotate by a paper conveyance motor (not illustrated). A driven roller 161 facing the conveyance roller 160 is configured to rotate following the rotation of the conveyance roller 160.

Printing operation (printing processing) of the printer 100 will now be described with reference to FIGS. 5A to 7.

Figure 7:
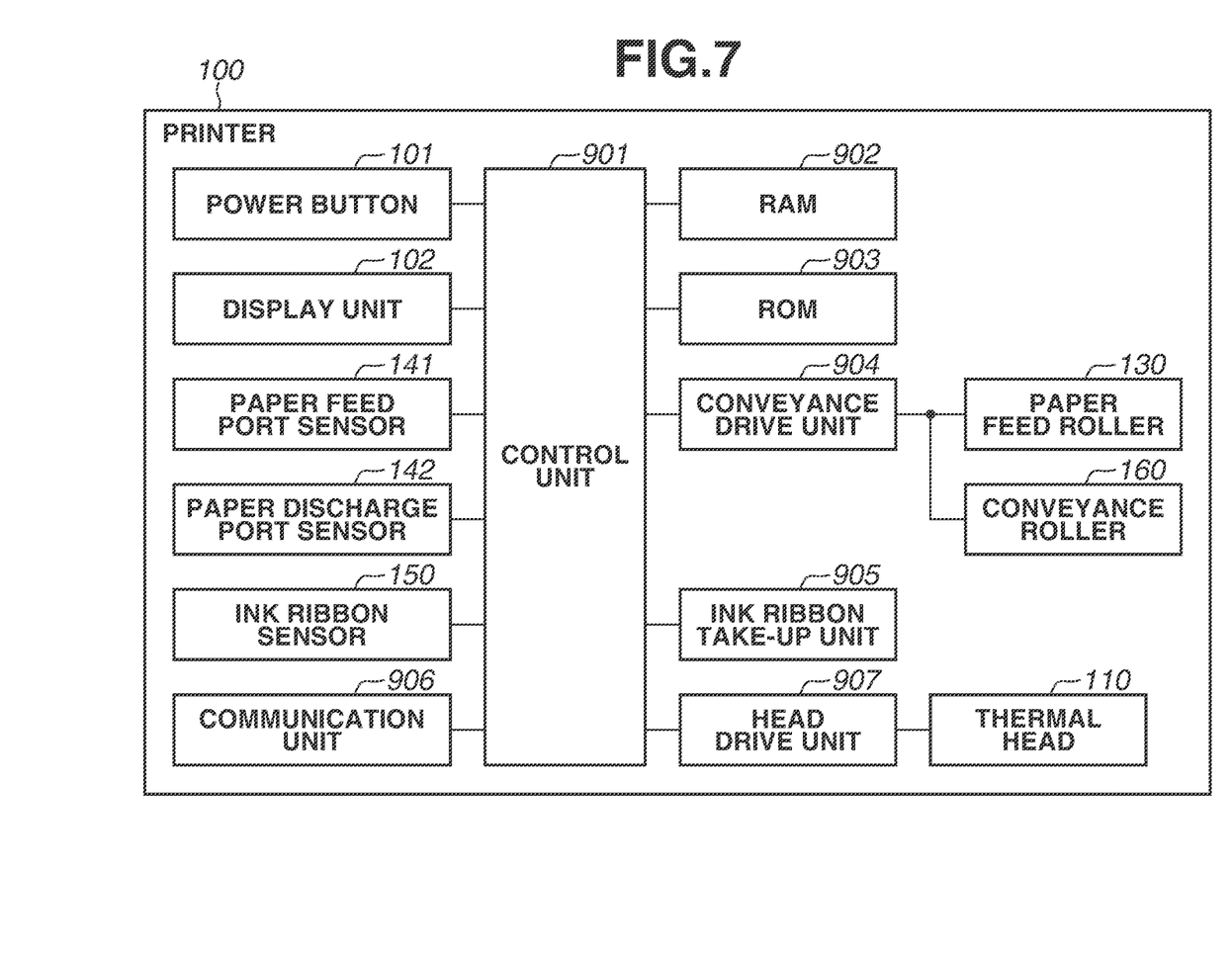
FIG. 7 illustrates a system configuration of the printer.

FIG. 7 illustrates a system configuration of the printer 100 according to the exemplary embodiment of the present disclosure.

A control unit 901 including at least one processor, such as a central processing unit (CPU), controls each unit of the printer 100 and performs various calculation processing. A random access memory (RAM) 902 is a work memory for temporarily storing data and performing various processing. A read only memory (ROM) 903 is a nonvolatile memory for storing programs and various data. The control unit 901 reads a program from the ROM 903 and performs processing and calculations based on the read program.

The control unit 901 monitors operation on the power button 101 and turns power of the printer 100 on and off according to the operation on the power button 101. The control unit 901 also performs display control processing for controlling the display state (ON/blink/OFF and the display color) of the display unit 102.

The control unit 901 monitors various sensors, such as the paper feed port sensor 141, the paper discharge port sensor 142, and the ink ribbon sensor 150, and controls each unit to perform various processing depending on the detection results of the sensors.

A conveyance drive unit 904 includes the feed roller 130, the conveyance roller 160, a paper feed drive motor connected to the feed roller 130, and a paper conveyance motor connected to the conveyance roller 160. Driving these motors rotates the feed roller 130 and the conveyance roller 160 to convey the paper 300. The control unit 901 controls the conveyance drive unit 904 to perform paper feed operation, paper conveyance during printing, and paper discharge operation. The paper feed drive motor and the paper conveyance motor may be separately provided. Alternatively, the same single motor may be used as a drive source of the feed roller 130 and the conveyance roller 160. By controlling the rotational direction of the conveyance roller 160, the conveyance drive unit 904 (paper conveyance motor) can convey the paper 300 in the direction of the arrow D (e.g., the paper feed direction illustrated in FIG. 5B, the paper conveyance direction during printing illustrated in FIG. 5F, and the paper discharge direction illustrated in FIG. 5G) and in the direction of the arrow E opposite to the direction of the arrow D.

The ink ribbon take-up unit 905 includes a bobbin engagement portion (not illustrated) engaging with the take-up bobbin 207, and an ink take-up motor for rotating the bobbin engagement portion. When the ink take-up motor is driven to rotate the bobbin engagement portion, the take-up bobbin 207 is rotated to take up the ink ribbon 210. The control unit 901 controls the ink ribbon take-up unit 905 to perform ink ribbon take-up processing. In the ink ribbon take-up processing, the ink ribbon 210 of the supply bobbin storage 206 is taken up around the take-up bobbin 207. The ink take-up motor can be separately provided, or commonly used for the drive sources of the feed roller 130 and the conveyance roller 160.

A communication unit 906 wirelessly connects with an external apparatus, acquires printing target image data as print data from the external apparatus, and notifies the external apparatus of the printer status (e.g., printing, and error). In the present exemplary embodiment, the communication unit 906 wirelessly connects with the external apparatus. Alternatively, the communication unit 906 may connect with the external apparatus by wire.

A head drive unit 907 drives the thermal head 110. The head drive unit 907 drives the thermal head 110 based on the print data received from the external apparatus by the communication unit 906 and transfers the ink applied to the ink ribbon 210 onto the paper 300, thereby printing an image.

Figure 6:
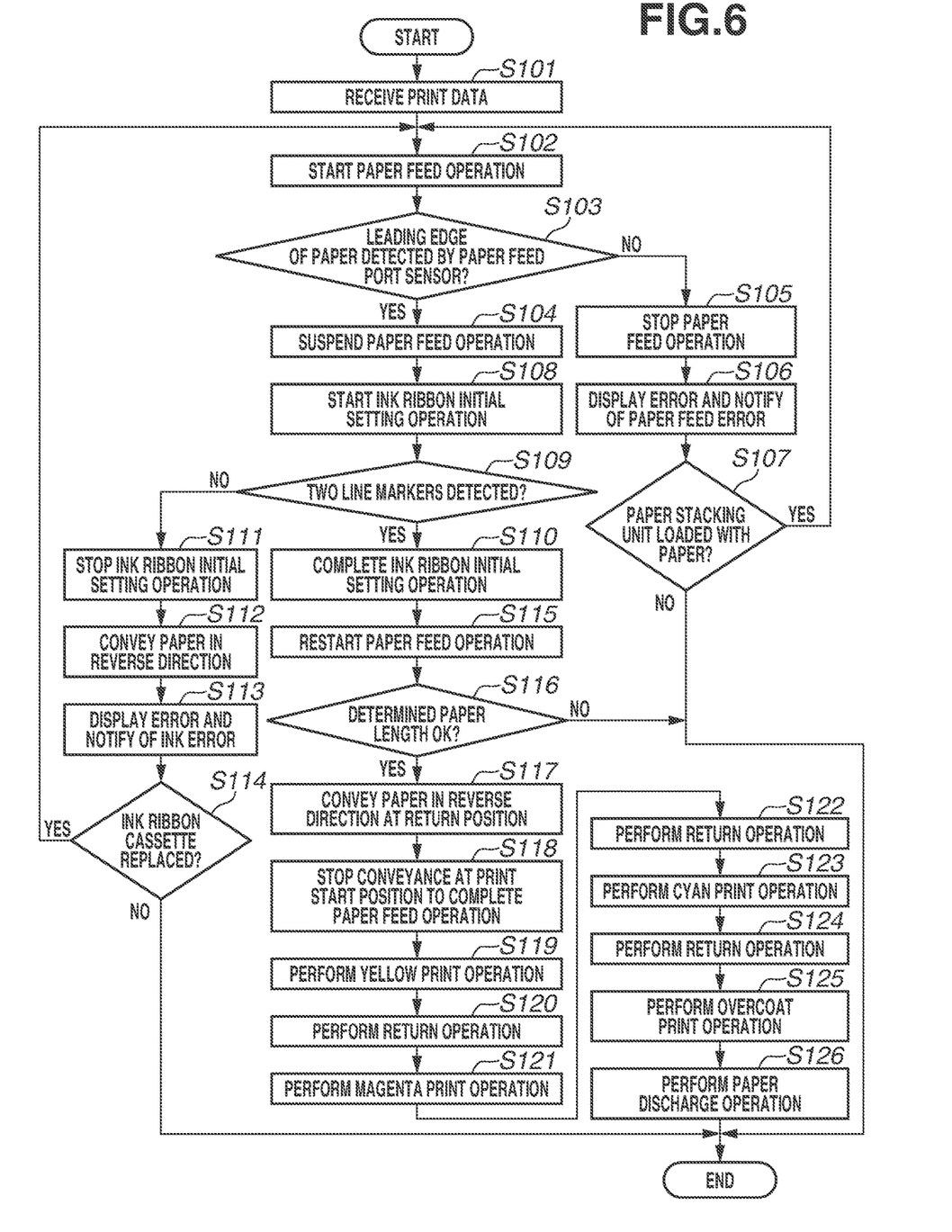
FIG. 6 is a flowchart illustrating the printing operation of the printer according to an exemplary embodiment of the present disclosure.

FIG. 6 is a flowchart illustrating printing operation of the printer 100 according to the exemplary embodiment of the present disclosure. The printing operation is implemented when the control unit 901 executes a program read from the ROM 903.

When the ink ribbon cassette 200 and the paper 300 are loaded in the printer 100 and the power button 101 is operated by the user, the printer 100 turns on the power of the printer 100 and the processing illustrated in FIG. 6 starts.

In step S101, when print data (printing target image data) is transmitted from a portable terminal (not illustrated), such as a smart phone, to the printer 100, the communication unit 906 receives the print data from the portable terminal. The control unit 901 stores the received print data in the RAM 902 and changes the display of the display unit 102 to the blinking state indicating a data reading (receiving) state. The blinking state of the display unit 102 continues until the reception of the print data is completed, and stops when the inspection of the print data is completed. When the reception of the print data is completed, the control unit 901 changes the display of the display unit 102 from the blinking state to the lighting state. The processing then proceeds to step S102.

In step S102, the control unit 901 starts the paper feed operation (paper feed processing). In the paper feed operation, the control unit 901 rotates the thermal head 110 counterclockwise around the head supporting axis 112 by using a drive source (not illustrated) to move the thermal head 110 from the stand-by position illustrated in FIG. 5A to the intermediate position illustrated in FIG. 5B. The control unit 901 moves the feed roller 130 from the withdrawal position illustrated in FIG. 5A to the paper feed position (illustrated in FIG. 5B) where the feed roller 130 comes in contact with the paper 300. The control unit 901 then turns the feed roller 130 clockwise illustrated in FIGS. 5A to 5G by using the conveyance drive unit 904 (paper feed drive motor) to convey (feed) the paper 300 stacked on the paper stacking unit 106 toward the inside of the printer 100. The paper 300 conveyed by the feed roller 130 comes in contact with the separation plate 131 disposed on the printer 100. The leading edge of the paper 300 in the paper feed direction (direction of the arrow D) pushes up the paper guide 132, allowing only the uppermost sheet of the paper 300 to be conveyed to the inside of the printer 100. As described above, the separation plate 131 separates only the uppermost sheet from a plurality of sheets stacked on the paper stacking unit 106 and feeds the sheet toward the inside of the printer 100.

In step S103, the control unit 901 determines whether the paper feed port sensor 141 detects the leading edge of the paper 300 in the paper feed direction. When the paper feed port sensor 141 detects the paper 300 (YES in step S103), the processing proceeds to step S104. If the paper feed port sensor 141 does not detect the paper 300 within a predetermined time period since the feed roller 130 started rotating (NO in step S103), the control unit 901 determines that the paper stacking unit 106 is not loaded with the paper 300. The processing then proceeds to step S105.

In step S104, the conveyance drive unit 904 (paper feed drive motor) stops the rotation of the feed roller 130. Specifically, the conveyance drive unit 904 suspends the paper feed operation in a state where the leading edge of the paper 300 in the paper feed direction (direction of the arrow D) is positioned at the paper feed port sensor 141, and the trailing edge of the paper 300 in the paper feed direction is within the paper stacking unit 106. The control unit 901 then moves the feed roller 130 from the paper feed position illustrated in FIG. 5B to the withdrawal position illustrated in FIG. 5C by using a drive source (not illustrated) to separate the feed roller 130 from the paper 300. Since the paper guide 132 is constantly urged in the downward direction (toward the separation plate), the paper 300 is stably supported in a state of being sandwiched between the separation plate 131 and the paper guide 132 at the position illustrated in FIG. 5C.

When the paper feed port sensor 141 does not detect the paper 300 within a predetermined time period (NO in step S103), the processing proceeds to step S105. In step S105, the conveyance drive unit 904 (paper feed drive motor) stops the rotation of the feed roller 130. The control unit 901 then moves the feed roller 130 from the paper feed position illustrated in FIG. 5B to the withdrawal position illustrated in FIG. 5A by using a drive source (not illustrated) to stop the paper feed operation. The control unit 901 rotates the thermal head 110 counterclockwise around the head supporting axis 112 by using a drive source (not illustrated) to move the thermal head 110 from the intermediate position illustrated in FIG. 5B to the stand-by position illustrated in FIG. 5A. In step S105 as described above, the control unit 901 and the conveyance drive unit 904 stop the paper feed operation, and move the positions of the thermal head 110 and the feed roller 130 so that the printer 100 shifts to the stand-by state. In step S106, the control unit 901 turns on the display unit 102 of the printer 100 in red (for error notification). The control unit 901 further notifies the portable terminal, from which the print data has been received in step S101, of a paper feed error indicating that the paper feed has not been performed via the communication unit 906. The control unit 901 then promotes the user to load the paper stacking unit 106 of the printer 100 with the paper 300. In step S107, the control unit 901 determines whether the paper stacking unit 106 is loaded with the paper 300 by the user. When the control unit 901 determines that the paper stacking unit 106 is loaded with the paper 300 (YES in step S107), the processing returns to step S102. In contrast, when the control unit 901 determines that the paper stacking unit 106 is not loaded with the paper 300 (NO in step S107), the control unit 901 cancels the print processing for the print data received in step S101. The processing then ends the flowchart. When loading the paper stacking unit 106 with the paper 300, the user once opens a paper cover (not illustrated), loads the paper stacking unit 106 with the paper 300, and closes the paper cover again. If the paper cover is not closed, the control unit 901 cannot start printing. According to the present exemplary embodiment, a sensor for detecting the opening and closing of the paper cover is provided. If the sensor detects that the paper cover has been once opened and then closed, the control unit 901 determines that the paper stacking unit 106 is loaded with the paper 300. However, the control unit 901 may detect the paper 300 by using other methods.

In step S108, the control unit 901 starts the initial setting operation for the yellow dye 211 of the ink ribbon 210. When the initial setting operation for the ink ribbon 210 starts, the ink ribbon take-up unit 905 turns the take-up bobbin 207 engaging with the engagement portion provided on the printer 100 to take up the ink ribbon 210 wound around the supply bobbin 205 around the take-up bobbin 207. As illustrated in FIG. 4, the marker 215 is provided at the top position of each color of the ink ribbon 210. In particular, the two markers 215 are provided at the top position of the yellow dye 211. The ink ribbon sensor 150 detects that the reflected light is blocked by the marker 215 provided on the ink ribbon 210. When the ink ribbon sensor 150 detects the two markers 215 in succession within a predetermined time period, the initial setting of the yellow dye 211 can be performed.

In step S109, the control unit 901 determines whether the ink ribbon sensor 150 detects the two markers 215 at the top position of the yellow dye 211. If the two markers 215 are detected (YES in step S109), the processing proceeds to step S110. In step S110, the ink ribbon take-up unit 905 stops taking up the ink ribbon 210 (stops the rotation of the take-up bobbin 207) and completes the initial setting operation for the yellow dye 211. On the other hand, when the two markers 215 are not detected within a predetermined time period since the ink ribbon take-up unit 905 has started taking up the ink ribbon 210 (NO in step S109), the control unit 901 determines that the ink ribbon 210 in the ink ribbon cassette 200 attached to the printer 100 runs out. The processing then proceeds to step S111.

When the ink ribbon 210 runs out and the two markers 215 are not detected, then in step S111, the ink ribbon take-up unit 905 stops taking up the ink ribbon 210 (stops the rotation of the take-up bobbin 207). In step S112, the control unit 901 moves the feed roller 130 from the withdrawal position illustrated in FIG. 5C to the paper feed position illustrated in FIG. 5B by using a drive source (not illustrated) to bring the feed roller 130 into contact with the paper 300. In this state, the conveyance drive unit 904 (paper feed drive motor) turns the feed roller 130 to convey the paper 300 toward the paper stacking unit 106. In other words, the conveyance drive unit 904 conveys the paper 300 in the direction of the arrow E opposite to the paper feed direction (direction of the arrow D). By conveying the paper 300 over a predetermined distance in the reverse direction, the paper 300 can be completely sent back to the paper stacking unit 106, i.e., the paper 300 that has been fed once can be stored back into the paper stacking unit 106 again. In step S104, the control unit 901 suspends the paper feed in a state where part of the paper 300 is stored in the paper stacking unit 106 (a state where the trailing edge of the paper 300 in the paper feed direction is remained within the paper stacking unit 106). The paper 300 that has been fed once can therefore be easily sent back to the paper stacking unit 106 by conveying the paper 300 in the reverse direction. The control unit 901 rotates the thermal head 110 counterclockwise around the head supporting axis 112 by using a drive source (not illustrated) to move the thermal head 110 from the intermediate position illustrated in FIG. 5B to the stand-by position illustrated in FIG. 5A, and shifts the printer 100 to the stand-by state. In step S113, the control unit 901 turns on the display unit 102 in red to notify the user of an error. The control unit 901 further notifies the portable terminal, from which the print data has been received in in step S101, of an ink error indicating that the ink ribbon 210 of the ink ribbon cassette 200 runs out via the communication unit 906. The control unit 901 then prompts the user to replace the ink ribbon cassette 200. In step S114, the control unit 901 determines whether the ink ribbon cassette 200 has been replaced by the user. If the control unit 901 determines that the ink ribbon cassette 200 has been replaced (YES in step S114), the processing returns to step S102. If the control unit 901 determines that the ink ribbon cassette 200 has not been replaced (NO in step S114), the control unit 901 cancels the print processing for the print data received in step S101. The processing then ends the flowchart. The printer 100 according to the present exemplary embodiment includes an ink cassette detection sensor for detecting whether the ink ribbon cassette 200 is attached to the printer 100. When the ink cassette detection sensor detects that the ink ribbon cassette 200 is detached (not attached) and then detects that the ink ribbon cassette 200 is attached, the control unit 901 determines that the ink ribbon cassette 200 has been replaced. If the ink ribbon cassette 200 is not replaced for a predetermined time period, the control unit 901 determines that the ink ribbon cassette 200 has not been replaced.

When the two markers 215 are detected, then in step S110, the ink ribbon take-up unit 905 stops taking up the ink ribbon 210 (stops the rotation of the take-up bobbin 207) to complete the initial setting operation for the ink ribbon 210.

In step S115, the control unit 901 moves the feed roller 130 from the withdrawal position illustrated in FIG. 5C to the paper feed position illustrated in FIG. 5B by using a drive source (not illustrated) to bring the feed roller 130 into contact with the paper 300. In this state, the conveyance drive unit 904 (paper feed drive motor) turns the feed roller 130 to convey the paper 300 in the paper feed direction (direction of the arrow D), thus restarting the paper feed operation. In this case, the conveyance drive unit 904 (paper conveyance motor) turns the conveyance roller 160 according to the rotational speed of the feed roller 130 to allow the leading edge of the paper 300 in the paper feed direction to enter the nip position without a load when the paper 300 is conveyed up to the nip position between the conveyance roller 160 and the driven roller 161. As described above, after the paper feed operation is restarted, the paper 300 is conveyed in the paper feed direction (arrow D) in a state of being nipped between the conveyance roller 160 and the driven roller 161.

In step S116, if the paper feed port sensor 141 detects the trailing edge of the paper 300 in the paper feed direction, the control unit 901 determines the length of the paper 300 based on the amount of the paper conveyance since the paper feed port sensor 141 detects the leading edge of the paper 300 in step S103 until the sensor 141 detects the trailing edge thereof. If the amount of paper conveyance from the leading edge to the trailing edge of the paper 300 is within a predetermined range (YES in step S116), the control unit 901 determines that the length of the paper 300 is a predetermined length. The processing then proceeds to step S117. If the control unit 901 determines that the length of the paper 300 is not the predetermined length (NO in step S116), the paper size is inappropriate and is unsuitable for the printer 100. Thus, the control unit 901 discharges the paper 300 and ends the print processing. When the paper feed port sensor 141 detects the trailing edge of the paper 300, the conveyance drive unit 904 (paper feed drive motor) stops the rotation of the feed roller 130. The control unit 901 then moves the feed roller 130 from the paper feed position to the withdrawal position illustrated in FIG. 5D by using a drive source (not illustrated). The result of detecting the trailing edge of the paper 300 by the paper feed port sensor 141 generated in step S116 is used to determine not only the length of the paper 300 but also the position of the paper 300 in step S116 and subsequent steps. More specifically, the control unit 901 controls the amount of the paper conveyance after the detection of the trailing edge of the paper 300 performed in step S116, thereby conveying the paper 300 up to a specific position or stopping the paper conveyance at a specific position (e.g., the printing start position or the return position).

When the trailing edge of the paper 300 is detected by the paper feed port sensor 141, and the paper 300 is further conveyed up to the return position illustrated in FIG. 5D by the conveyance roller 160, then in step S117, the control unit 901 controls the conveyance roller 160 to convey the paper 300 in the reverse direction (direction of the arrow E) to the paper feed direction. More specifically, when the paper 300 is conveyed to the return position in the paper feed direction (direction of the arrow D), the conveyance drive unit 904 (paper conveyance motor) stops the rotation of the conveyance roller 160, and restarts the rotation thereof in the reverse direction to convey the paper 300 in the direction of the arrow E. When the paper 300 is conveyed in the reverse direction, the paper 300 passes above the paper guide and then is conveyed toward the conveyance path above the paper stacking unit 106 because the paper guide 132 is urged in the downward direction illustrated in FIG. 5D. When the paper 300 is conveyed in the reverse direction up to the printing start position illustrated in FIG. 5E, then in step S118, the conveyance drive unit 904 (paper conveyance motor) stops the rotation of the conveyance roller 160 to stop the paper conveyance, and completes the paper feed operation.

In step S119, the control unit 901 performs yellow color printing operation. The control unit 901 rotates the head arm 111 by using a drive source (not illustrated) to move the thermal head 110 to the print position illustrated in FIG. 5F, and brings the paper 300 and the ink ribbon 210 into pressure contact with each other by using the thermal head 110 and the platen roller 120. Subsequently, the conveyance drive unit 904 (paper conveyance motor) drives the conveyance roller 160 to convey the paper 300 in the paper conveyance direction during printing (direction of the arrow D). While the paper 300 is being conveyed, the head drive unit 907 drives the thermal head 110 to perform the yellow color printing operation for transferring yellow ink onto the paper 300. The control unit 901 generates a print signal based on the print data received in step S101. The head drive unit 907 heats the heating device of the thermal head 110 based on the print signal to thermally transfer the yellow dye 211 applied on the ink ribbon 210 onto the paper 300, thus performing the yellow color printing operation. During the printing operation, the ink ribbon take-up unit 905 rotatably drives the take-up bobbin 207 to convey the ink ribbon 210 in the direction of the arrow D at the same conveyance speed as that of the paper 300.

When the yellow color printing operation is completed, the processing proceeds to step S120. In step S120, the control unit 901 performs the return conveyance operation to proceed with magenta color printing operation. In step S120, the control unit 901 rotates the head arm 111 to move the thermal head 110 to the intermediate position illustrated in FIG. 5D, and cancels the pressure contact between the thermal head 110 and the platen roller 120. The conveyance drive unit 904 (paper conveyance motor) turns the conveyance roller 160 to perform the return conveyance operation on the paper 300 in the direction of the arrow E, and then stops the paper conveyance at the printing start position illustrated in FIG. 5E. In parallel, the ink ribbon take-up unit 905 turns the take-up bobbin 207. When the ink ribbon sensor 150 detects the marker 215 provided at the top position of the magenta dye 212, the ink ribbon take-up unit 905 stops the rotation of the take-up bobbin 207 to complete the initial setting of the magenta dye 212.

In step S121, the control unit 901 performs the magenta color printing operation, which is similar to the above-described yellow color printing operation. The control unit 901 moves the thermal head 110 to the print position illustrated in FIG. 5F to bring the paper 300 and the ink ribbon 210 into pressure contact with each other by using the thermal head 110 and the platen roller 120. Subsequently, while conveying the paper 300 in the direction of the arrow D by using the conveyance roller 160, the control unit 901 heats the heating device of the thermal head 110 based on the print signal to thermally transfer the magenta dye 212 applied on the ink ribbon 210 onto the paper 300.

In step S122, the control unit 901 performs the return conveyance operation in a similar way to step S120 and also performs the initial setting for the cyan dye 213 to proceed with cyan color printing operation. The control unit 901 moves the thermal head 110 to the intermediate position to release the pressure contact between the thermal head 110 and the platen roller 120. The control unit 901 then performs the return conveyance operation on the paper 300 in the direction of the arrow E by using the conveyance roller 160 and stops the paper conveyance at the printing start position illustrated in FIG. 5E. In parallel, the control unit 901 turns the take-up bobbin 207. When the ink ribbon sensor 150 detects the marker 215 provided at the top position of cyan dye 213, the control unit 901 stops the rotation of the take-up bobbin 207 to complete the initial setting of the cyan dye 213.

In step S123, the control unit 901 performs the cyan color printing operation similar to the above-described yellow color printing operation and magenta color printing operation. The control unit 901 moves the thermal head 110 to the print position illustrated in FIG. 5F to bring the paper 300 and the ink ribbon 210 into pressure contact with each other by using the thermal head 110 and the platen roller 120. Subsequently, while conveying the paper 300 in the direction of the arrow D by using the conveyance roller 160, the control unit 901 heats the heating device of the thermal head 110 based on the print signal, and thermally transfers the cyan dye 213 applied on the ink ribbon 210 onto the paper 300.

After completing the printing operations for three colors, the printer 100 according to the present exemplary embodiment performs an overcoat printing operation to reduce the possibility that the image printed on the paper 300 is degraded by external factors.

In step S124, the control unit 901 performs the return conveyance operation in a similar way to step S120. The control unit 901 moves the thermal head 110 to the intermediate position to release the pressure contact between the thermal head 110 and the platen roller 120. The control unit 901 then performs the return conveyance operation on the paper 300 in the direction of the arrow E by using the conveyance roller 160, and stops the paper conveyance at the printing start position illustrated in FIG. 5E. In parallel, the control unit 901 turns the take-up bobbin 207. When the ink ribbon sensor 150 detects the marker 215 provided at the top position of overcoat layer 214, the control unit 901 stops the rotation of the take-up bobbin 207 to complete the initial setting for the overcoat layer 214.

In step S125, the control unit 901 performs the overcoat printing operation similar to the above-described yellow color printing operation. The control unit 901 moves the thermal head 110 to the print position illustrated in FIG. 5F to bring the paper 300 and the ink ribbon 210 into pressure contact with each other by using the thermal head 110 and the platen roller 120. Subsequently, while conveying the paper 300 in the direction of the arrow D by using the conveyance roller 160, the control unit 901 heats the heating device of the thermal head 110 based on the print signal to thermally transfer the overcoat layer 214 applied on the ink ribbon 210 onto the paper 300.

When the overcoat printing operation is completed, then in step S126, the control unit 901 performs the paper discharge operation. The conveyance drive unit 904 (paper conveyance motor) rotatably drives the conveyance roller 160 to convey the paper 300 in the direction of the arrow D. The control unit 901 conveys the paper 300 up to the position illustrated in FIG. 5G where the trailing edge of the paper 300 in the paper conveyance direction (paper discharge direction) leaves the nip position between the conveyance roller 160 and the driven roller 161. The control unit 901 rotates the head arm 111 by using a drive source (not illustrated) to move the thermal head 110 to the stand-by position illustrated in FIG. 5G. At this timing, the paper 300 is in a state of being detected by the paper discharge port sensor 142. The control unit 901 then turns on the display unit 102. The communication unit 906 further notifies the portable terminal, from which the print data has been received in step S101, to remove the printed paper 300 from the paper discharge port. When the printed paper 300 is removed by the user, and the paper discharge port sensor 142 detects that the paper 300 is removed, the control unit 901 turns off the display unit 102 and ends the print processing.

As described above, if the printer 100 according to the present exemplary embodiment starts printing in a state where the paper stacking unit 106 is not loaded with the paper 300, the paper feed port sensor 141 cannot detect the paper 300 in step S103, resulting in an error. Thus, even if there is no new paper 300, the initial setting for the ink ribbon 210 is not performed, making it possible to cancel or restart the print processing without wasting inks. The printer 100 according to the present exemplary embodiment detects the presence or absence of paper with the paper feed port sensor 141 after starting the paper feed operation. The paper feed port sensor 141 is disposed in the paper conveyance path and is used to determine the paper length and control the paper conveyance position. It is therefore not necessary to provide a sensor dedicated for detecting whether the paper stacking unit 106 is loaded with the paper 300.

If the print processing is started in a state where the ink ribbon 210 in the ink ribbon cassette 200 runs out, an error occurs due to the fact that the ink ribbon sensor 150 cannot detect the two markers 215 at the top position of the yellow dye 211 in step S109. If an error occurs, the control unit 901 conveys the paper 300 in the reverse direction to send back the paper 300 to the paper stacking unit 106 in step S112, making it possible to cancel or restart the print processing without wasting the paper 300. Further, the printer 100 automatically sends back the paper 300 once fed to the paper stacking unit 106. Thus, to reuse the paper 300 once fed, the user does not need to pull out the paper 300 from the printer 100 and sending back the paper 300 to the paper stacking unit 106.

The present disclosure has specifically been described based on the above-described preferred exemplary embodiments. However, the present disclosure is not limited thereto but can be modified and changed in diverse ways within the scope of the appended claims.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-015606, filed Jan. 31, 2020, which is hereby incorporated by reference herein in its entirety.

What is claimed is:

1. A printing apparatus comprising:
    a thermal head configured to transfer ink applied to an ink ribbon onto paper;
    a paper feed unit configured to feed paper stacked on a paper stacking unit and convey the paper;
    a paper detection unit configured to detect the paper fed by the paper feed unit;
    an ink ribbon take-up unit configured to take up the ink ribbon;
    an ink ribbon detection unit configured to detect a printing start position of the ink ribbon; and
    a control unit configured to control the paper feed unit to feed the stacked paper from the paper stacking unit, suspend the conveyance of the paper by the paper feed unit upon detection of the fed paper with the paper detection unit, take up the ink ribbon with the ink ribbon take-up unit, stop the ink ribbon take-up with the ink ribbon take-up unit upon detection of the printing start position of the ink ribbon by the ink ribbon detection unit, and restart the conveyance of the paper with the paper feed unit.

2. The printing apparatus according to claim 1,
    wherein the paper feed unit is configured to convey paper in both a paper feed direction and a reverse direction, and
    wherein, in a case where the ink ribbon detection unit cannot detect the printing start position of the ink ribbon, the control unit controls the paper feed unit to convey the conveyance suspended paper in the reverse direction.

3. The printing apparatus according to claim 2, wherein, in a case where the ink ribbon detection unit cannot detect the printing start position of the ink ribbon, the control unit controls the paper feed unit to convey the conveyance suspended paper in the reverse direction to send the paper back to the paper stacking unit.

4. The printing apparatus according to claim 2, wherein, in a case where the ink ribbon detection unit cannot detect the printing start position of the ink ribbon within a predetermined time after the ink ribbon take-up unit starts taking up the ink ribbon, the control unit controls the paper feed unit to convey the conveyance suspended paper in the reverse direction.

5. The printing apparatus according to claim 1, wherein, when suspending the conveyance of the paper with the paper feed unit upon detection of the paper fed by the paper feed unit by the paper detection unit, the control unit controls the paper feed unit to suspend the conveyance of the paper such that a trailing edge of the paper is within the paper stacking unit.

6. The printing apparatus according to claim 1,
    wherein the paper feed unit includes a feed roller,
    wherein the feed roller is movable to a paper feed position where the feed roller comes in contact with paper to allow the paper to be conveyed, and to a withdrawal position where the feed roller is separated from the paper, and
    wherein, upon detection of the paper fed by the paper feed unit by the paper detection unit, the control unit controls the paper feed unit to suspend the conveyance of the paper and controls the feed roller to move to the withdrawal position.

7. The printing apparatus according to claim 6,
    wherein, while the ink ribbon take-up unit takes up the ink ribbon, the control unit controls the feed roller to move to the withdrawal position, and
    wherein, when restarting the conveyance of the paper with the paper feed unit, the control unit controls the feed roller to move to the paper feed position to restart the conveyance of the paper.

8. The printing apparatus according to claim 1, wherein the paper detection unit is disposed between the paper stacking unit and the thermal head.

9. The printing apparatus according to claim 1, wherein the paper detection unit is disposed on a downstream side of the paper stacking unit in a paper feed direction and on an upstream side of a print position of the thermal head in the paper feed direction.

10. The printing apparatus according to claim 1, wherein, after restarting the conveyance of the paper with the paper feed unit, the control unit controls the paper feed unit to convey the paper to the printing start position.

11. The printing apparatus according to claim 1, further comprising:
   a separation plate configured to feed only one sheet of the paper stacked on the paper stacking unit; and
   a paper guide urged toward the separation plate,
   wherein the paper fed by the paper feed unit is supported by the paper guide and the separation plate.

12. The printing apparatus according to claim 11, wherein the control unit controls the paper feed unit to suspend the conveyance of the paper in a state where the paper is supported by the paper guide and the separation plate.

13. A method for a printing apparatus having a thermal head, the method comprising:
   transferring, via the thermal head, ink applied to an ink ribbon onto paper;
   feeding stacked paper and conveying the paper;
   detecting the fed paper;
   taking up the ink ribbon;
   detecting a printing start position of the ink ribbon; and
   controlling to control feed the stacked paper, suspend the conveyance of the paper upon detection of the fed paper, take up the ink ribbon, stop the ink ribbon take-up upon detection of the printing start position of the ink ribbon, and restart the conveyance of the paper.

14. A non-transitory computer-readable storage medium storing a program to cause a computer to perform a method for a printing apparatus having a thermal head, the method comprising:
   transferring, via the thermal head, ink applied to an ink ribbon onto paper;
   feeding stacked paper and conveying the paper;
   detecting the fed paper;
   taking up the ink ribbon;
   detecting a printing start position of the ink ribbon; and
   controlling to control feed the stacked paper, suspend the conveyance of the paper upon detection of the fed paper, take up the ink ribbon, stop the ink ribbon take-up upon detection of the printing start position of the ink ribbon, and restart the conveyance of the paper.

* * * * *